Patented Oct. 7, 1947

2,428,450

UNITED STATES PATENT OFFICE 2,428,450

PREPARING PURIFIED MIXTURES OF ESTERS

Michael A. Eitelman, Hamburg, N. Y., assignor to Allied Chemical & Dye Corporation, a corporation of New York No Drawing. Application March 1, 1941, Serial No. 381,413

17 Claims. (Cl. 260—410.9)

This invention is concerned with the preparation of mixed alcohols from mixtures of higher hydrocarbons.

A procedure sometimes employed in converting hydrocarbons into alcohols has been to chlorinate such hydrocarbons, to condense the chlorinated products with sodium acetate to form the corresponding esters of acetic acid, and to hydrolyze the said esters to the corresponding alcohols. The products of condensation of the halogenated hydrocarbons and sodium acetate contain as impurities considerable quantities of unreacted hydrocarbon halides and considerable quantities of olefines formed during the course of the condensation reactions by the splitting off of hydrogen halide from the hydrocarbon halides.

In the case of an individual hydrocarbon or a mixture of hydrocarbons which contains only a small number of carbon atoms, the impurities and the ester product boil at sufficiently widely separated temperatures to permit separation of impurities from the esters by simple distillation.

However, if a similar process is applied to a mixture of hydrocarbons containing 10 or more carbon atoms per molecule, the esters and impurities formed boil at approximately the same temperatures or their boiling ranges overlap to a substantial extent in the composite product. Thus it becomes exceedingly difficult if not impossible to separate the impurities from the desired esters by distillation. If the impure mixture of esters is converted directly without purification into the corresponding mixture of alcohols by saponification, the impurities are still present and their separation from the alcohols presents the same problem.

It is an object of this invention to provide a process for preparing alcohols from higher hydrocarbons which does not involve the separation problem presented by former processes and which leads to the production of mixtures of higher alcohols, which are substantially free from non-alcoholic impurities.

In accordance with my invention a mixture of halogenated "higher hydrocarbons" containing halogenated non-aromatic hydrocarbon groups is condensed with a salt of a monobasic carboxylic acid containing not less than 6 carbon atoms in its molecule, and as a flux a quantity of free monobasic carboxylic acid containing not less than 6 carbon atoms in its molecule, thereby forming a mixture of esters; the mixture of esters is separated from non-ester impurities by distillation and is subsequently converted to a corresponding mixture of alcohols.

By the term "higher hydrocarbons" as used in this application I mean hyrocarbons containing at least 10 carbon atoms per molecule. Mixtures such as commercial kerosene and distillates and distillation residues thereof are illustrative of such higher hydrocarbon mixtures. They may comprise highly complex mixtures of straight and branched chain aliphatic compounds and alicyclic hydrocarbons, which may contain aromatic hydrocarbon substituents. They may be obtained by fractional distillation of petroleum or by fractional distillation of cracking, or cracking and hydrogenation, products of petroleum or bituminous shales or by fractional distillation of hydrogenated Edeleanu extracts, hydrogenated coal tars, or their cracking products.

I have found that by forming a mixture of esters of a monobasic carboxylic acid containing 6 or more carbon atoms as aforesaid, I am able, by distillation, to remove substantially completely impurities, such as unreacted halogen compounds and olefines, without substantial loss of ester product.

This advantage of my process is illustrated by the following comparison: A chlorinated kerosene boiling between 150° and 160° C. at 8 mm. absolute pressure was condensed with sodium acetate in the presence of glacial acetic acid as solvent. The reaction mixture was fractionally distilled and the fraction which boiled in the temperature range from 170° to 190° C., at 8 mm. absolute pressure and which contained the esters of acetic acid, was separately recovered. This fraction contained 49% of esters; the balance consisting of impurities not separable by ordinary fractional distillation from the esters. If the fraction is hydrolyzed, the resulting mixture of alcohols likewise is not separable from these impurities by ordinary fractional distillation.

When condensed with sodium benzoate in the presence of benzoic acid, the same kerosene chloride yielded a mixture from which, by fractional distillation, an ester fraction was obtained which boiled in the temperature range from 215° to 250° C. at 5 mm. absolute pressure, and contained over 86% of esters. Thus, although a markedly broader cut was made in the case of the benzoate (a 35° cut as compared with a 20° cut), the ratio of esters to impurities in this cut was about six times the ratio in the acetate product.

The halogenated hydrocarbons may contain—as the halogen—fluorine, chlorine, bromine, or iodine. The salts used for condensation with the halogenated hydrocarbons include alkali metal, alkaline earth metal, and heavy metal salts of aliphatic and aromatic monocarboxylic acids. Examples of such salts are sodium benzoate, sodium stearate, sodium salicylate, potassium benzoate, silver benzoate, calcium benzoate, zinc benzoate, copper palmitate, lithium hexahydrobenzoate, barium oleate, calcium linoleate, etc. Mixtures of two or more salts of different acids may be used.

After the formation and purification of the mixtures of esters, the latter are hydrolyzed by any conventional procedure to the corresponding mixtures of alcohols.

The alcohol mixtures obtained by the process of the present invention are useful as general solvents and as raw materials for manufacture of esters, such as the phthalic acid esters, useful as plasticizers for cellulose esters; they are also valuable as intermediates for preparing inorganic and organic acid partial esters, such as acid sulfuric esters and salts thereof, which are valuable as wetting, dispersing and cleaning agents.

A halogenated hydrocarbon mixture suitable for the purposes of the invention may be prepared as follows:

A kerosene fraction comprising a mixture of hydrocarbons containing between 12 and 19 carbon atoms, inclusive, per molecule as determined, for example, by a comparison of the boiling range thereof with the boiling ranges of hydrocarbons of known average molecular carbon content, is chlorinated until the organically bound chlorine in the mixture corresponds approximately to the amount which theoretically would be present if every hydrocarbon in the mixture were monochlorinated.

Such a chlorinated hydrocarbon mixture is preferably fractionally distilled to separate the portion which consists chiefly of monochlorinated hydrocarbons from unreacted hydrocarbons and polychlorinated hydrocarbons, and the separated monochlor hydrocarbon portion is subjected to the process of this invention, preferably as follows:

The chlorinated hydrocarbon mixture is heated with slightly less than its molecularly equivalent amount of the sodium salt of a carboxylic acid containing not less than 6 carbon atoms and, in addition, sufficient of the free acid to render the reaction mass fluid under reaction conditions. Conditions, such as pressure, are maintained so that reactants are not lost from the reaction vessel by evaporation. The time of heating and the temperature of the reaction mixture are selected so as to strike an optimum balance between two factors: (1) the greater tendency toward completeness of reaction at higher temperatures and with prolonged heating periods, and (2) the greater tendency toward decomposition of product and of the chlorinated hydrocarbon observed when the reaction mixture is heated to high temperatures and for long periods. Generally the reaction proceeds satisfactorily between about 150° C. and about 275° C. and the optimum combination of time and temperature is about two hours at 200° to 250° C., but particular conditions depend upon the particular reaction.

As reaction flux or solvent there is used a free monobasic carboxylic acid which contains not less than 6 carbon atoms in the molecule; but preferably the acid used corresponds to the carboxylic acid salt which is being condensed. This flux is used in amount at least equal to the weight of the sodium salt.

The mixture is then fractionally distilled at about 10 mm. absolute pressure whereby there can be obtained in good yield a fraction consisting of the esters of the carboxylic acid employed in the condensation, which fraction is substantially free from unsaturated and chlorinated hydrocarbons. This fraction is then hydrolyzed by any standard method, such as by refluxing for several hours with an excess of alcoholic caustic soda, whereby the alcoholic components are set free and may be separated from the reaction mixture by fractional distillation.

Halogenated kerosene fractions having an average molecular carbon content between 12 and 19 are preferred because of their cheapness and because on treating them in accordance with this invention they yield alcohols which are particularly valuable solvents, and the sulfuric acid derivatives of which are highly useful detergents and wetting agents.

Chlorinated products are preferred to other halogenated products because of their cheapness, their ease of preparation, and as compared with brominated and iodinated products, their somewhat higher vapor pressure.

The sodium salt is preferred since it affords the optimum combination of a cheap alkali and ease of preparation in the anhydrous form.

A slight excess of chlorinated hydrocarbon results in greater smoothness of reaction and increased yield.

It is preferable to employ as flux or solvent the free acid corresponding to the carboxylic acid salt being condensed because the yield is thereby increased.

The specific examples set forth below illustrate how this invention can be carried out. Quantities are expressed as parts by weight.

Example 1.—A fraction of kerosene which was derived from Pennsylvania petroleum and had a boiling range of 130° to 170° C. at 10 mm. absolute pressure and consisted primarily of 15, 16, 17 and 18 carbon atom hydrocarbons, was chlorinated with a direct stream of gaseous chlorine in the presence of diffused sunlight until the increase in weight of the chlorinated mixture, because of organically combined chlorine therein, amounted to about 13%. It was chiefly a mixture of unchlorinated hydrocarbons, monochlorinated hydrocarbons, and dichlorinated hydrocarbons with an average molecular carbon content between 17 and 18 carbon atoms.

50 parts of benzoic acid and 25 parts of sodium benzoate were melted together and to the agitated mixture 50 parts of the foregoing mixture of chlorinated hydrocarbons were added. The reacting mass was maintained at a temperature between 230° and 240° C. for about 2 hours and then distilled in vacuo. The fraction which distilled off between 215° and 250° C. at 5 mm. absolute pressure was collected separately. It consisted of a neutral viscous oil, insoluble in water and warm dilute aqueous caustic soda, and comprised about 86% kerosene benzoate (the kerosene radicals having an average carbon content between 17 and 18 carbon atoms).

30 parts of the ester product were mixed with 36 parts of a 10% (by weight) alcoholic solution of caustic soda and the whole was stirred and heated under reflux at atmospheric pressure for about 2½ hours. At the end of this time, the reacting mass was diluted with 200 parts of water, allowed to stand, and the oily upper layer consisting of a crude mixture of alcohols was separated. It was washed two or three times with water until the wash water was neutral to brilliant yellow.

The mixture of alcohols was a red oil which was insoluble in water, had an odor characteristic of long-chain aliphatic alcohols, and could be distilled in vacuo without appreciable decomposition. The alcohol mixture had an average carbon content between 17 and 18 atoms per molecule.

*Example 2.*—A straight-run kerosene from Pennsylvania petroleum was distilled, and the distillate distilling over in the temperature range from 118° to 131° C. at 5 mm. absolute pressure, and consisting essentially of 15 and 16 carbon atom hydrocarbons, was collected separately and chlorinated with a direct stream of gaseous chlorine in the presence of daylight and at a temperature below 50° C. until the organically combined chlorine therein amounted to about 13.6%. The chlorinated mixture thus obtained was distilled in vacuo and the fraction which distilled between 135° and 150° C. at 6 mm. absolute pressure was collected separately. It consisted largely of monochlorinated hydrocarbons which had an average molecular carbon content of about 16.

A mixture consisting of 90 parts of this chlorinated kerosene distillate, 50 parts of anhydrous sodium benzoate, and 90 parts benzoic acid was continuously agitated and maintained at a temperature between 230° and 240° C. and at atmospheric pressure for about 20 hours. The mixture was then distilled in vacuo, and the fraction which distilled off between 196° and 218° C. at 10 mm. absolute pressure was collected separately. The fraction consisted of a neutral oil which was insoluble in water and in warm aqueous caustic soda and consisted of 99% kerosene benzoate.

A portion of the oil was refluxed with about 5 times its weight of a normal alcoholic solution of caustic soda for 2½ hours to hydrolyze the kerosene benzoate. The mixture of alcohols removed from the hydrolyzed product was a clear pale yellow liquid of sp. gr. 20°/15°=0.845, boiling from 145° to 175° C. at 15 mm. absolute pressure.

*Example 3.*—Kerosene which was derived from Pennsylvania petroleum, and had been washed with concentrated sulfuric acid, was distilled and the fraction boiling between 170° and 180° C. at 5 mm. absolute pressure was collected separately as a mixture of hydrocarbons consisting primarily of 19 and 20 carbon atom hydrocarbons. This distilled kerosene fraction was chlorinated directly with chlorine gas in diffused sunlight at a temperature of about 70° C. until the organically combined chlorine in the mixture amounted to about 12%, i. e. about monochlorination. The chlorinated mixture was distilled in vacuo and the fraction which distilled between 185° C. and 200° C. at 5 mm. absolute pressure was collected separately. It consisted chiefly of the monochlorinated hydrocarbons.

A mixture of 600 parts of this chlorinated hydrocarbon mixture, 600 parts benzoic acid, and 200 parts sodium benzoate was agitated and maintained between 230° and 240° C. for about 2 hours and then distilled in vacuo. The fraction which distilled between 210° and 255° C. at 5 mm. absolute pressure was collected separately. It consisted of a neutral yellow viscous oil, insoluble in water and in warm aqueous caustic soda. It comprised chiefly kerosene benzoate (the kerosene radicals averaging about 19 carbon atoms).

183 parts of the kerosene benzoate product were mixed with 83½ parts of 5% alcoholic solution of caustic soda, and the mixture was stirred and heated under reflux to its boiling temperature for about 2 hours. The mixture was then cooled, diluted with water, and the oil separated. It was washed with water until the washings were neutral. 100 parts of a light red oil were thus obtained. 65 parts of this crude oil were distilled. About 80% of it distilled between 170° and 220° C. at 1 mm. absolute pressure without apparent decomposition.

The mixture of alcohols thus obtained as a light yellow oil was sulfonated with 100% $H_2SO_4$ and neutralized with dilute aqueous caustic soda, yielding a clear aqueous solution which possessed marked detergent properties. The alcohols in the mixture, like the esters from which they were derived, had an average carbon content of about 19 carbon atoms.

*Example 4.*—Kerosene which was derived from Pennsylvania petroleum was distilled and the distillate which boiled between 55° and 75° C. at 15 mm. absolute pressure was collected separately. A portion of this fraction, which consisted principally of 10 and 11 carbon atom hydrocarbons, was chlorinated with a direct stream of chlorine in the presence of light at a temperature below 40° C. until the organically combined chlorine therein amounted to about 19.3%. The chlorinated mixture thus obtained was distilled in vacuo and the fraction which distilled between 75° and 125° C. at 15 mm. absolute pressure was collected separately. It consisted largely of a mixture of monochlorinated hydrocarbons which had an average molecular carbon content between 10 and 11.

568 parts of stearic acid were melted and agitated at 120° C. at 80 parts of 50% aqueous caustic soda were gradually added. Water was allowed to distill off as the caustic solution was added. The mixture was agitated and heated to 170° C. while a distillate therefrom of 58 parts of water was collected.

To this heated mixture 185 parts of the foregoing monochlorinated hydrocarbon distillate were added as the mixture was agitated, and maintained at a temperature between 160° and 170° C. The temperature of the mixture was then gradually raised to 215° C. over a period of 1½ hours and refluxed at about 215° C. for ½ hour longer. The mixture boiled vigorously at this temperature. It was then cooled to 200° C. and distilled in vacuo. 91 parts of a mixture, consisting chiefly of olefine and chlorinated hydrocarbons, were collected as the distillate boiling below 150° C. at 15 mm. absolute pressure.

The residue was transferred to an autoclave, mixed with 420 parts of 14% aqueous caustic soda, and agitated for about 16 hours between 150° and 160° C. The autoclave charge was cooled to about 50° C. and the solid mass was warmed with 360 parts of aqueous 10% hydrochloric acid solution. From the slurry 300 parts of neutral aqueous salt solution were separated and the residue was distilled in vacuo. A distillate fraction consisting of about 50 parts of oil and about 400 parts of water was collected before the temperature of the vapors from the distilling mixture exceeded 150° C. at 15 mm. absolute pressure. The oil was separated from this distillate fraction and distilled between 85° and 125° C. at 20 mm. absolute pressure. The resulting distillate had a specific gravity at 20°/15°=0.856. It consisted chiefly of a mixture of alcohols. It was a light yellow oil with the odor characteristic of moderately long-chain alcohols. It distilled in steam with comparative ease and was very slightly soluble in water. It was miscible in all proportions with ethyl alcohol, and practically insoluble in dilute aqueous acid and alkali. The oil reacted with 100% $H_2SO_4$ with evolution of heat to form a dark red liquid which, when drowned in dilute aqueous caustic, formed a clear solution of the alkyl sodium sulfate which foamed readily when agitated and had detergent properties.

*Example 5.*—A distilled fraction of kerosene from Pennsylvania petroleum was selected by boiling range comparison with known hydrocarbons as a mixture which consisted principally of 14 carbon atom hydrocarbons. It was chlorinated directly with chlorine gas in the presence of diffused light until the organically combined chlorine was equal to that required theoretically for monochlorination. The chlorinated mixture was distilled, and the fraction distilling between 130° and 155° C. at 18 mm. absolute pressure was collected separately as the desired mixture of chlornated hydrocarbons which comprised chiefly the monochlorinated compounds.

568 parts stearic acid and 83 parts of a 50% aqueous caustic soda solution were mixed and heated slowly to 170° C. to remove water, then 232 parts of the foregoing chlorinated hydrocarbon distillate were added in small portions over a period of about 15 minutes while the temperature of the reacting mass was maintained at about 190° C. The mixture was then heated under reflux to its refluxing temperature, i. e. about 215° to 220° C. for about 2 to 3 hours. The mass was cooled and distilled until a distillate of about 93 parts consisting chiefly of chlorinated hydrocarbons was collected. (The last of this distillate was obtained at about 165° C. at 24 mm. absolute pressure).

The distillation residue was cooled, transferred to an autoclave, mixed with 300 parts water and 135 parts of 50% aqueous caustic soda, and heated and agitated under pressure at a temperature of about 150° to about 160° C. for about 16 hours. The contents of the autoclave were then cooled and thoroughly mixed with 140 parts of 20° Bé. hydrochloric acid and 200 parts water. The mixture was heated and agitated under reflux until the whole mass was fluid, then it was cooled until the organic material therein became solid. The aqueous brine which separated from the solid was removed and the residual organic matter was distilled in vacuo. The distillate going off in the vapor temperature range of 130° to 165° C. at 18 mm. absolute pressure was collected as the alcohol product. It consisted chiefly of a slightly turbid straw-yellow oil (specific gravity at 20°/15°=0.839), which separated from the water distillate and which was insoluble in dilute aqueous caustic soda. It had the odor commonly associated with long-chain alcohols and consisted of a mixture of alcohols having an average molecular carbon content of 14. The mixture of alcohols was miscible in all proportions with kerosene and fairly soluble in alcohol.

*Example 6.*—A fraction of kerosene from Pennsylvania petroleum, which fraction had a boiling range of from 110° to 125° C. at 6 mm. absolute pressure and consisted of 14, 15, and 16 carbon atom hydrocarbons, was chlorinated directly with a stream of chlorine gas in the presence of sunlight and at a temperature below 50° C. until the organically combined chlorine therein was equal to about 13.9%, i. e. until the amount of organically combined chlorine was substantially equal to that required if monochlorination of all the hydrocarbons in the mixture had been effected.

The chlorinated mixture was distilled in vacuo, and the fraction going over at vapor temperatures from 125° to 145° C. at 6 mm. absolute pressure was collected separately. A mixture of 100 parts of this chlorinated hydrocarbon distillate, 64 parts of dry sodium salicylate, and 100 parts of salicylic acid was maintained between 230° and 240° C. for about 20 hours. At about 200° C. the mixture became a homogeneous solution, from which crystals of common salt were deposited as the formation of the ester proceeded. At the end of the heating period, the mixture was washed with dilute aqueous caustic and distilled in vacuo, and the fraction going over at vapor temperature from 195° to 225° C. at 10 mm. absolute pressure was collected separately.

The distillate fraction so collected was a neutral oil, insoluble in water and in warm aqueous caustic. It comprised chiefly kerosene salicylates (the kerosene radicals containing an average of 15 to 16 carbon atoms), from which the alcohols could be obtained in the same manner as described in connection with Example 1.

*Example 7.*—A commercial "aromatic extract" derived from petroleum was identified by boiling range comparison with known hydrocarbons as a mixture which contained an average of about 12 carbon atom hydrocarbons. This product had a specific gravity at 24° C. of 0.862 and more than 50% of it was soluble in concentrated sulfuric acid. It was chlorinated directly with chlorine gas in the presence of about 0.04% added iodine until the organically combined chlorine in the chlorinated mixture was equal to about 106% of that required to be present theoretically if all the hydrocarbon in the mixture were monochlorinated. The chlorinated mixture was distilled, and the fraction distilling between 95° and 125° C. at 15 mm. absolute pressure was collected separately as the desired mixture comprising chiefly monochlorinated compounds.

100 parts of sodium benzoate and 500 parts of benzoic acid were agitated and heated to 200° C. 140 parts of the foregoing monochloride fraction were then added gradually over ½ hour as the reaction temperature was increased to 220° C. Agitation was continued for 2 hours longer and the temperature was maintained at 220° to 230° C. After being cooled to 170° C., the turbid liquid was drowned in cold water and neutralized by slow addition to 50% aqueous caustic soda. The lower aqueous layer was withdrawn and the oily layer was diluted with about 88 parts of benzene and filtered. The filtrate was washed with aqueous caustic soda of about 1% NaOH concentration and distilled. The residue boiling above 145° C. at 15 mm. absolute pressure was taken as the desired kerosene benzoate. It was a dark viscous oil. Saponification of a sample showed it to be 91% ester, calculated as a ($C_{12}$) kerosene monobenzoate. The resulting oil was dark brown and had a distinctly phenolic odor. A coupling test was positive for phenolic bodies.

*Example 8.*—A distilled fraction of kerosene from Pennsylvania petroleum was selected by boiling range comparison with known hydrocarbons as a mixture of hydrocarbons which contained between 13 and 14 carbon atoms per average molecule. It was chlorinated directly with chlorine gas in the presence of about 0.04% added iodine until the organically combined chlorine was equal to that required theoretically for about 120% of monochlorination. The chlorinated mixture was distilled and the fraction distilling between 120° and 145° C. at 25 mm. absolute pressure was collected separately as the desired mixture comprising chiefly monochlorinated compounds.

100 parts of calcium benzoate and 500 parts of benzoic acid were agitated and heated to 200° C. 200 parts of the foregoing monochloride fraction were then added gradually over ½ hour as the reaction temperature was increased to 220° C. Except for a small amount of white precipitate, the mass was a clear liquid. Agitation was continued for 2 hours longer and the temperature maintained at 220° to 230° C. After cooling to 160° C., the liquid mass was quenched on ice and neutralized with caustic soda. About 83 parts of benzene were added and the lower aqueous layer was withdrawn. The oil was washed once with very dilute caustic and then distilled. The fraction distilling between 165° C. at 15 mm. absolute pressure and 205° C. at 4 mm. absolute pressure was collected separately as the desired kerosene benzoate. It was a yellow, mobile oil having practically no odor. Saponification of a sample showed it to be 103.5% ester, calculated as a ($C_{13.5}$) kerosene monobenzoate. The alcohol so obtained was a light yellow mobile oil having an odor typical of the long chain aliphatic alcohols.

I claim:

1. A process of preparing purified mixtures of esters adapted to be hydrolyzed to mixtures of alcohols, which comprises condensing a mixture of halogenated higher hydrocarbons containing halogenated non-aromatic hydrocarbon groups with a salt of a monocarboxylic acid containing not less than 6 carbon atoms in its molecule in the presence of a flux comprising a monocarboxylic acid containing not less than 6 carbon atoms in its molecule, thereby forming a mixture of monocarboxylic acid esters, and freeing the mixture of esters from impurities by distillation.

2. In a process of preparing mixtures of alcohols containing not more than a small proportion of non-alcoholic impurities, the steps which comprise condensing a mixture of halogenated hydrocarbons containing halogenated non-aromatic hydrocarbon groups and between 12 and 19 carbon atoms per molecule with a salt of a monocarboxylic acid containing not less than 6 carbon atoms in its molecule in the presence of a flux comprising a monocarboxylic acid containing not less than 6 carbon atoms in its molecule, thereby forming a mixture of monocarboxylic acid esters, and freeing the mixture of esters from impurities by distillation, whereby a purified mixture of esters yielding the corresponding mixture of alcohols upon hydrolysis is produced.

3. In a process of preparing mixtures of alcohols containing not more than a small proportion of non-alcoholic impurities, the steps which comprise heating a mixture of chlorinated higher hydrocarbons containing chlorinated non-aromatic hydrocarbon groups with a salt of a monocarboxylic acid containing not less than 6 carbon atoms in its molecule in the presence of a flux comprising a monocarboxylic acid containing not less than 6 carbon atoms in its molecule, at a pressure sufficient to maintain said chlorinated higher hydrocarbons in liquid phase at reaction temperature, thereby forming a mixture of monocarboxylic acid esters, and freeing the mixture of esters from impurities by distillation at a pressure substantially below reaction pressure, whereby a purified mixture of esters yielding the corresponding mixture of alcohols upon hydrolysis is produced.

4. In a process of preparing mixtures of alcohols containing not more than a small proportion of non-alcoholic impurities, the steps which comprise reacting a mixture of chlorinated higher hydrocarbons containing chlorinated non-aromatic hydrocarbon groups with a salt of benzoic acid in a benzoic acid flux, thereby forming a mixture of esters of benzoic acid, and freeing the mixture of esters from impurities by distillation, whereby a purified mixture of esters yielding the corresponding mixture of alcohols upon hydrolysis is produced.

5. In a process of preparing mixtures of alcohols containing not more than a small proportion of non-alcoholic impurities, the steps which comprise reacting a mixture of chlorinated higher hydrocarbons containing chlorinated non-aromatic hydrocarbon groups with a salt of stearic acid in a stearic acid flux, thereby forming a mixture of esters of stearic acid, and freeing the mixture of esters from impurities by distillation, whereby a purified mixture of esters yielding the corresponding mixture of alcohols upon hydrolysis is produced.

6. In a process of preparing mixtures of alcohols containing not more than a small proportion of non-alcoholic impurities, the steps which comprise reacting a mixture of chlorinated higher hydrocarbons containing chlorinated non-aromatic hydrocarbon groups with a salt of salicylic acid in a salicylic acid flux, thereby forming a mixture of esters of salicylic acid, and freeing the mixture of esters from impurities by distillation, whereby a purified mixture of esters yielding the corresponding mixture of alcohols upon hydrolysis is produced.

7. In a process of preparing mixtures of alcohols containing not more than a small proportion of non-alcoholic impurities, the steps which comprise reacting a halogenated kerosene with a salt of a monocarboxylic acid containing not less than 6 carbon atoms in its molecule in a flux of said acid, thereby forming a mixture of esters of the carboxylic acid, and distilling off impurities from the mixture of esters, whereby a purified mixture of esters yielding the corresponding mixture of alcohols upon hydrolysis is produced.

8. In a process of preparing mixtures of alcohols containing not more than a small proportion of non-alcoholic impurities, the steps which comprise heating at a temperature between 150° C. and 275° C. a halogenated petroleum distillate having an average molecular carbon content of not less than 10 with a salt of a monocarboxylic acid containing not less than 6 carbon atoms in its molecule in a flux of said acid, thereby forming a mixture of monocarboxylic acid esters, and distilling off impurities from the mixture of esters, whereby a purified mixture of esters yielding the corresponding mixture of alcohols upon hydrolysis is produced.

9. In a process of preparing mixtures of alcohols containing not more than a small proportion of non-alcoholic impurities, the steps which comprise heating at a temperature between 150° C. and 275° C. a halogenated petroleum distillate consisting mainly of monohalogenated hydrocarbons containing between 12 and 19 carbon atoms per molecule with a salt of a monocarboxylic acid containing not less than 6 carbon atoms in its molecule in a flux of said acid, thereby forming a mixture of monocarboxylic acid esters, and distilling off impurities from the mixture of esters, whereby a purified mixture of esters yielding the corresponding mixture of alcohols upon hydrolysis is produced.

10. In a process of preparing mixtures of alcohols containing not more than a small proportion of non-alcoholic impurities, the steps which comprise heating at a temperature between 150° C. and 275° C. a kerosene chloride consisting mainly of hydrocarbon monochlorides containing between 12 and 19 carbon atoms per molecule with an alkali-metal salt of a monocarboxylic acid containing not less than 6 carbon atoms in its molecule in a flux of said acid, thereby forming a mixture of monocarboxylic acid esters, and distilling off impurities from the mixture of esters, whereby a purified mixture of esters yielding the corresponding mixture of alcohols upon hydrolysis is produced.

11. A process of preparing a purified mixture of esters adapted to be hydrolyzed to a mixture of monohydroxy alcohols, which comprises heating at a temperature between 150° C. and 275° C. a chlorinated petroleum distillate consisting essentially of monochlorinated saturated hydrocarbons containing between 12 and 19 carbon atoms per molecule with an alkali-metal salt of a monocarboxylic acid containing at least 6 carbon atoms in its molecule in a flux of said acid, thereby forming a mixture of esters of the carboxylic acid, and distilling off impurities from the mixture of esters.

12. A process of preparing a purified mixture of esters adapted to be hydrolyzed to a mixture of monohydroxy alcohols, which comprises reacting a chlorinated petroleum distillate consisting essentially of monochlorinated saturated hydrocarbons containing between 12 and 19 carbon atoms per molecule with sodium benzoate in the presence of a benzoic acid flux at a temperature between 150° C. and 275° C. and about atmospheric pressure, thereby forming a mixture of esters of the benzoic acid, subsequently reducing the pressure on said mixture of esters and distilling off impurities therefrom.

13. A process of preparing a purified mixture of esters adapted to be hydrolyzed to a mixture of monohydroxy alcohols, which comprises reacting a chlorinated petroleum distillate consisting essentially of monochlorinated saturated hydrocarbons containing between 12 and 19 carbon atoms per molecule with sodium salicylate in the presence of a salicylic acid flux at a temperature between 150° C. and 275° C. and about atmospheric pressure, thereby forming a mixture of esters of the salicylic acid, subsequently reducing the pressure on said mixture of esters and distilling off impurities from the mixture of esters.

14. A process of preparing a purified mixture of esters adapted to be hydrolyzed to a mixture of monohydroxy alcohols, which comprises reacting a chlorinated petroleum distillate consisting essentially of monochlorinated saturated hydrocarbons containing between 12 and 19 carbon atoms per molecule with sodium stearate in the presence of stearic acid flux at a temperature between 150° C. and 275° C. and about atmospheric pressure, thereby forming a mixture of esters of the stearic acid, subsequently reducing the pressure on said mixture of esters and distilling off impurities from the mixture of esters.

15. An improved process for preparing a mixture of monocarboxylic acid esters, which comprises condensing a mixture of halogenated higher hydrocarbons containing halogenated non-aromatic hydrocarbon groups with a salt of a monocarboxylic acid containing not less than 6 carbon atoms in its molecule, in the presence of a flux comprising a monocarboxylic acid containing not less than 6 carbon atoms in its molecule.

16. A process for preparing a mixture of monocarboxylic acid esters of phenols and of alcohols, which comprises condensing a mixture of halogenated higher hydrocarbons containing halogenated, aromatic and non-aromatic hydrocarbon groups with a salt of a monocarboxylic acid containing not less than 6 carbon atoms in its molecule, in the presence of a flux comprising a monocarboxylic acid containing not less than 6 carbon atoms in its molecule.

17. In a process of preparing mixtures of alcohols and phenols containing not more than a small proportion of non-alcoholic and non-phenolic impurities, the steps which comprise condensing a mixture of halogenated higher hydrocarbons containing halogenated, aromatic and non-aromatic hydrocarbon groups with a salt of a monocarboxylic acid containing not less than 6 carbon atoms in its molecule in the presence of a flux comprising a monocarboxylic acid containing not less than 6 carbon atoms in its molecule, thereby forming a mixture of monocarboxylic acid esters, and freeing the mixture of esters from impurities by distillation, whereby a purified mixture of esters yielding the correspondling mixture of alcohols and phenols upon hydrolysis is produced.

MICHAEL A. EITELMAN.

REFERENCES CITED

The following references are of record in the file of this patent:

UNITED STATES PATENTS

| Number | Name | Date |
|---|---|---|
| 1,459,971 | Carter | June 26, 1923 |
| 1,691,425 | Ayres | Nov. 13, 1928 |
| 2,049,207 | Lawson | July 28, 1936 |
| 2,309,336 | Byrkit | Jan. 26, 1943 |

FOREIGN PATENTS

| Number | Country | Date |
|---|---|---|
| 119,249 | Great Britain | Oct. 3, 1918 |
| 218,466 | Germany | Jan. 27, 1910 |
| 239,650 | Germany | Oct. 19, 1911 |

Certificate of Correction

Patent No. 2,428,450.                                                October 7, 1947.

MICHAEL A. EITELMAN

It is hereby certified that errors appear in the printed specification of the above numbered patent requiring correction as follows: Column 2, line 23, for "160° C." read *165° C.*; column 6, line 29, for "at 80" read *as 80*; column 7, line 15, for "chlornated" read *chlorinated*; column 12, line 38, for "correspondling" read *corresponding*; and that the said Letters Patent should be read with these corrections therein that the same may conform to the record of the case in the Patent Office.

Signed and sealed this 2d day of December, A. D. 1947.

[SEAL]

THOMAS F. MURPHY,
*Assistant Commissioner of Patents.*